United States Patent [19]

Yanagisawa

[11] Patent Number: 5,508,061

[45] Date of Patent: Apr. 16, 1996

[54] METHOD OF MANUFACTURING A MAGNETIC STORAGE MEDIUM

[75] Inventor: Masahiro Yanagisawa, Tokyo, Japan

[73] Assignee: NEC Corporation, Tokyo, Japan

[21] Appl. No.: 420,564

[22] Filed: Apr. 12, 1995

Related U.S. Application Data

[62] Division of Ser. No. 294,970, Aug. 24, 1994.

[30] Foreign Application Priority Data

Aug. 25, 1993 [JP] Japan .................................. 5-232387

[51] Int. Cl.$^6$ .................................................. B05D 5/12
[52] U.S. Cl. ........................ 427/127; 427/129; 427/130; 427/131; 427/294; 427/299; 427/333; 427/336; 427/340; 427/343; 427/355; 427/385.5; 427/443.2

[58] Field of Search ...................... 427/127, 129, 427/130, 131, 132, 294, 295, 350, 355, 407.1, 299, 333, 336, 343, 340, 385.5, 443.2

Primary Examiner—Bernard Pianalto
Attorney, Agent, or Firm—Sughrue, Mion, Zinn, Macpeak & Seas

[57] ABSTRACT

A magnetic storage medium includes a substrate, a protective film, and a lubricant film. The substrate includes a magnetic body. The protective film is formed on the substrate and constituted by a carbon thin film having dangling bonds formed on a surface thereof. The lubricant film is coated on the protective film and bonded to some of the dangling bonds. An adsorption site ratio (density of dangling bonds/density of functional groups of lubricant film) which is a ratio of the density of the dangling bonds to the density of functional groups of the lubricant film exceeds 1.

6 Claims, 2 Drawing Sheets

METHOD OF MANUFACTURING A MAGNETIC STORAGE MEDIUM

This is a divisional of pending application Ser. No. 08/294,970, filed Aug. 24, 1994.

BACKGROUND OF THE INVENTION

The present invention relates to a magnetic storage medium and, more particularly, a magnetic storage medium in which friction caused by bringing a head into slidable contact with the magnetic storage medium is decreased and a method of manufacturing the magnetic storage medium.

As a recording/reproducing method of a magnetic storing apparatus having constituent units constituted by a magnetic recording/reproducing head (to be referred to as a head hereinafter) and a magnetic storage medium, the following method is generally known. That is, after the head and the magnetic storage medium surface are set in a contact state at the start in an operation, the magnetic storage medium is rotated at a predetermined rotational speed to form a spacing corresponding an air layer between the head and the magnetic storage medium surface, and, in this state, a recording/reproducing operation is performed (contact.start.stop scheme; to be referred to as CSS hereinafter). According to this method, the rotation of the magnetic storage medium is stopped upon completion of the operation, and, at this time, the head and the magnetic storage medium surface are set in a contact friction state as at the start in the operation. A friction force generated between the head and the magnetic storage medium in the above contact friction state causes wear between the head and the magnetic storage medium, and the head and the magnetic body may be damaged at last. In addition, in the contact friction state, a small change in posture of the head makes a force acting on the head ununiform, and the head and the magnetic storage medium surface may be damaged.

According to a conventional technique, in order to prevent friction of the magnetic storage medium caused by slidable contact between the head and the magnetic storage medium, a graphite- or diamond-like carbon film as described in U.S. Pat. No. 4,277,540 or U.S. Pat. No. 4,411,963 or Japanese Patent Laid-Open No. 62-103823 or 53-143206, or a carbon film containing hydrogen atoms as described in Japanese Patent Laid-Open No. 64-37711 is coated as a protective film, and a lubricant such as a perfluoropolyether described in Japanese Patent Laid-Open No. 52-49805 is coated on the protective film. In this case, as the perfluoropolyether, one of perfluoropolyethers each consisting of a main chain (parenthesized part) and functional groups "G" and expressed by the following formulas is used.

Lubricant A: $GCF_2(OCF_2)_p(OC_2F_4)_qOCF_2G$
(wherein p and q are integers of 2 to 25, and G is a functional group such as —COOH or —OH.)

Lubricant B: $F(C_3F_6O)_nC_2F_4G$
(wherein n is an integer of 3 to 25, and G is a functional group such as —COOH or —OH.)

Lubricant C: $F(CF(CF_3)CF_2O)_mCF_2G$
(wherein m is an integer of 3 to 25, and G is a functional group such as —COOH or —OH.)

However, the above carbon film does not have, on its surface, adsorption sites for adsorbing a lubricant, and the lubricant consisting of a perfluoropolyether is only coated on a protective film constituted by the carbon film. For this reason, the lubricant has poor adhesion properties to the protective film constituted by the carbon film, and the lubricant is gradually peeled in a CSS test. The protective film is worn to smooth the protective film surface, and a friction force increases, thereby degrading mechanical durability. This is because the surface of a carbon film formed by plasma chemical vapor deposition (CVD) or sputtering is stabilized by a graphite structure or double bonds. In addition, even when the graphite layer on the surface is mechanically removed by abrasion or the like, and adsorption sites such as dangling bonds are formed on the surface, although the dangling bonds are unstable in the air, the dangling bonds are oxidized or adsorb water so that the dangling bonds are stabilized within a short time (about several milliseconds). A dangling bond is defined as a chemical bond associated with an atom in the surface layer of a solid that does not join the atom with a second atom but extends in the direction of the solid's exterior. For example, according to description in Japanese Patent Laid-Open No. 64-37711, the dangling bonds of carbon atoms of a carbon film are eliminated by adding hydrogen atoms so as to stabilize the carbon film, and the adhesion properties of the carbon film to a ferromagnetic metal thin-film layer is improved. However, when the protective film is stabilized, the adhesion properties of the protective film to the ferromagnetic metal thin-film layer or a lubricant become poor, and mechanical durability is unexpectedly degraded.

SUMMARY OF THE INVENTION

It is an object of the present invention to provide a magnetic storage medium in which friction caused by bringing a head into slidable contact with the magnetic storage medium is decreased and a method of manufacturing the magnetic storage medium.

In order to achieve the above object, according to the present invention, there is provided a magnetic storage medium comprising a substrate including a magnetic body, a protective film formed on the substrate and constituted by a carbon thin film having dangling bonds formed on a surface thereof, and a lubricant film coated on the protective film and bonded to some of the dangling bonds, wherein an adsorption site ratio (density of dangling bonds/density of functional groups of lubricant film) which is a ratio of the density of dangling bonds to the density of functional groups of the lubricant film exceeds 1.

According to the present invention, the surface of a protective film constituted by a carbon film is slightly abraded by a magnetic head and an abrasive tape in a high vacuum atmosphere set to be a degree of vacuum of $10^{-3}$ Torr or more, and more preferably, $10^{-6}$ Torr or more, to form dangling bonds on the carbon film surface, thereby causing the protective film constituted by the carbon film to strongly adsorb a lubricant. The surface of the carbon film which is not mechanically removed adsorbs water or oxygen, the dangling bonds are eliminated, and the dangling bonds are not present on the carbon film. The surface layer of the carbon film is removed in a vacuum atmosphere to cut bonds between carbon atoms on the surface, thereby producing dangling bonds.

Before the dangling bonds adsorb water or oxygen, a lubricant is coated on the carbon film, so that the lubricant is strongly combined to the carbon film surface. Since each molecule of the lubricant is as long as about 30 nm, dangling bonds are left at portions of the lubricant molecules covered with main chains except for the functional group portions at the terminals of the lubricant molecules. Even if the lubricant molecules are removed by bringing the magnetic head into slidable contact with the carbon film, the remaining dangling bonds can adsorb a lubricant again. For this purpose, it is important to set a ratio "nd/nl" of a dangling bond density "nd" to a functional group density "nl" of the lubricant, i.e., an adsorption site ratio "r", to exceed 1. Some dangling bonds are combined to a lubricant, the remaining dangling bonds which are not combined to the lubricant are present. Assume that all the dangling bonds are consumed for adsorbing the lubricant (r=1). In this case, when the lubricant layer is removed by a slidable contact operation, self-restoring properties obtained by a recombination operation becomes difficult, thereby degrading durability. When all the functional groups of a lubricant cannot be adsorbed by dangling bonds because of a lack of dangling bonds (r<1), the adhesion force of the lubricant layer is short, thereby degrading durability.

In the perfluoropolyether described above, a main chain is oriented parallel to the protective film surface. For this reason, the functional group density "nl" of the lubricant can be changed by changing the number of functional groups of lubricant molecules, the length of the main chain of a lubricant molecule (proportional to a molecular weight), the orientation state on the protective film surface, and calcination conditions for strengthening bonds between the functional groups of the lubricant and the dangling bonds. Upon completion of a calcination operation, the adsorbed lubricant is washed with a solvent to remove weakly adsorbed lubricant, so that the functional group density "nl" changes. The functional group density "nl" can be calculated by a coverage calculated from the contact angle of the surface of an adsorption lubricant film and the size of a molecule calculated by the molecular orbital method. In each of the lubricants A, B, and C, the functional group density "nl" is normally $10^{11}$ to $10^{14}$ bonds/cm$^2$.

Although the dangling bond density "nd" varies depending on a degree of vacuum and slidable contact conditions, the dangling bond density can be changed to $10^{11}$ to $10^{15}$ bonds/cm$^2$. At a degree of vacuum of $10^{-6}$ Torr, as slidable contact conditions, a load ranges from 1 to 100 g, a rotational speed ranges from 10 to 300 rpm, and a slidable contact time ranges from 1 to 120 seconds. In this manner, the dangling bonds can be formed. The number of dangling bonds can be measured by the electron spin resonance (ESR) method. Although dangling bonds can also be formed such that a surface layer is removed by plasma ashing or plasma etching, i.e., by bombarding a plasma or ions on the surface layer, the dangling bonds can be mostly effectively formed such that the surface layer is mechanically removed by bringing an abrasive agent or a magnetic head into slidable contact with the protective film.

With the magnetic storage medium according to the present invention, some dangling bonds formed on the surface of the protective film constituted by a carbon film strongly hold a lubricant film and the protective film, the lubricant film is not easily removed by bringing a head into slidable contact with the protective film, and a self-restoring function obtained by re-adsorbance of the dangling bonds is made possible. Therefore, mechanical durability can be improved.

DESCRIPTION OF THE PREFERRED EMBODIMENT

Figure 1:
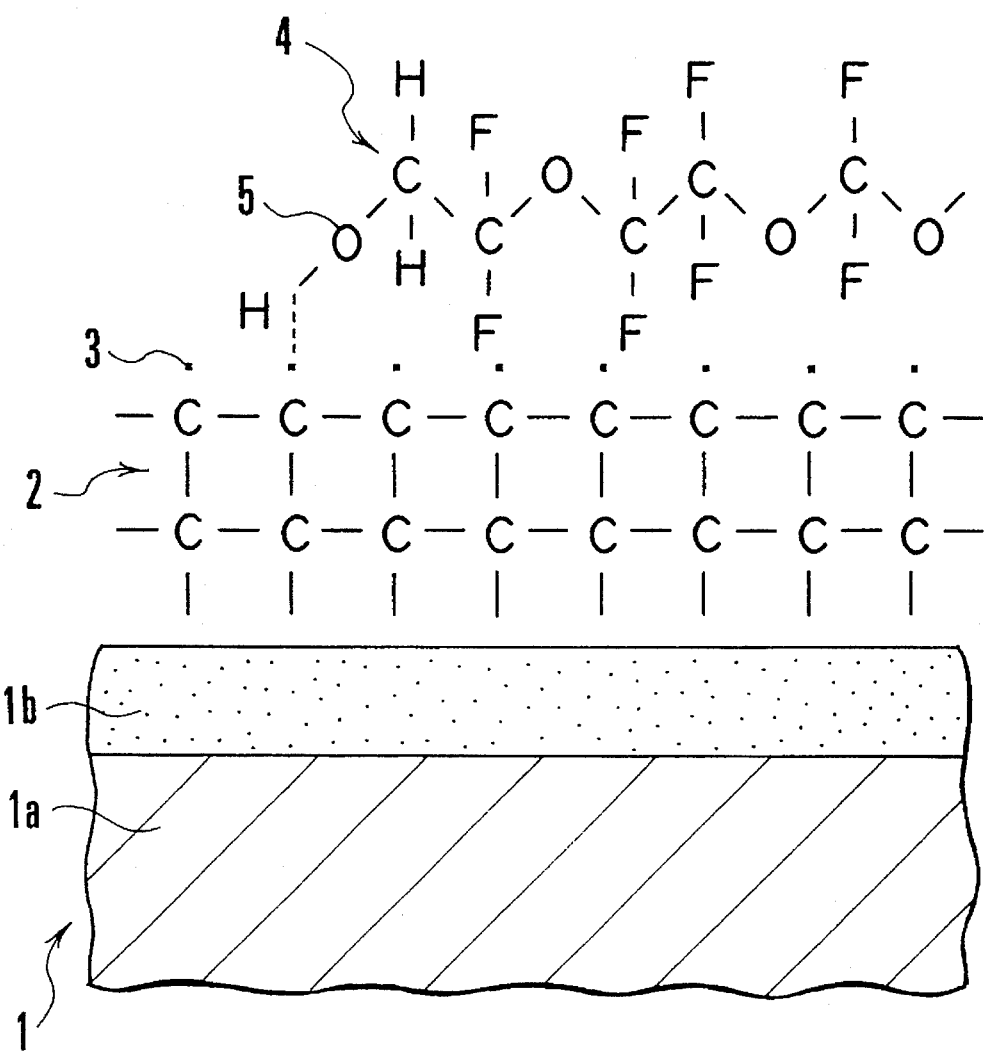
FIG. 1 is a sectional view showing a magnetic storage medium according to the present invention.

The present invention will be described below by way of its examples. FIG. 1 shows the sectional structure of a magnetic storage medium according to the present invention. The examples will be described below with reference to FIG. 1.

EXAMPLE 1

A nickel-phosphorus film was plated on an aluminum alloy substrate, a 30-nm cobalt-platinum-chromium alloy serving as a magnetic body 1b was plated on a substrate 1a planished at a surface roughness of 0.02 μm, so that an underlying material 1 was prepared. After carbon was sputtered onto the magnetic body 1b to form a protective film 2 constituted by a carbon film on the magnetic body 1b, while the magnetic disk substrate was rotated at 100 rpm and a degree of vacuum of $10^{-8}$ Torr, an abrasive tape was pressed onto the magnetic disk substrate at a load of 100 g for 10 minutes to abrade the surface of the protective film 2 constituted by a carbon film. As a result, $10^{14}$ dangling bonds 3 were formed per square centimeters. While the above vacuum state was kept, the resultant sample was entirely dipped into one of lubricants A to C consisting of perfluoropolyether and respectively having the following structures to coat the entire surface of the resultant structure with the corresponding one of the lubricants. The resultant sample was taken out in the air, and calcined at 180° C., and functional groups 5 of the lubricant were adsorbed in the dangling bonds 3. Thereafter, the resultant sample was dipped into a solution consisting of a perfluoroheptane to remove the excessive lubricant. In this manner, a lubricant layer 4 having a thickness of about 2 nm was formed, thereby forming a magnetic disk. Since a functional group density "nl" was $5.5 \times 10^{13}$ bonds/cm$^2$, r=1.8.

Lubricant A: $HOH_2CCF_2(OCF_2)_{13}(OC_2F_4)_{11}OCF_2CH_2OH$

Lubricant B: $F(C_3F_6O)_{17}C_2F_4CH_2OH$

Lubricant C: $F(CF(CF_3)CF_2O)_{15}CF_2COOH$

EXAMPLE 2

A magnetic disk was formed following the same procedures as in Example 1, except that in place of the abrasive tape, a magnetic head was brought into slidable contact with a protective film at a load of 15 g for 30 minutes to abrade the protective film surface. Since a dangling bond density "nd" was $2.7 \times 10^{14}$ bonds/cm$^2$, r =4.9.

EXAMPLE 3

A magnetic disk was formed following the same procedures as in Example 1, except that a burning temperature was set to be 150° C. Since a functional group density "nl" was $3.1 \times 10^{12}$ bonds/cm$^2$, r=32.

EXAMPLE 4

A magnetic disk was formed following the same procedures as in Example 1, except that a burning temperature was set to be 100° C. Since a functional group density "nl" was $4.6 \times 10^{11}$ bonds/cm$^2$, r=217.

EXAMPLE 5

A magnetic disk was formed following the same procedures as in Example 1, except that a calcination operation was not performed. Since a functional group density "nl" was $6.7 \times 10^{10}$ bonds/cm$^2$, r=1492.

EXAMPLE 6

A magnetic disk was formed following the same procedures as in Example 1, except that in place of the abrasive tape, a magnetic head was brought into slidable contact with a protective film at a load of 5 g for 30 minutes to abrade the protective film surface, and a calcination operation was performed at 100° C. Since a dangling bond density "nd" was $3.5 \times 10^{12}$ bonds/cm$^2$, r=7.6.

EXAMPLE 7

A magnetic disk was formed following the same procedures as in Example 1, except that in place of the abrasive tape, a magnetic head was brought into slidable contact with a protective film at a load of 10 g for 30 minutes to abrade the protective film surface, and a calcination operation was performed at 100° C. Since a dangling bond density "nd" was $6.9 \times 10^{12}$ bonds/cm$^2$, r=15.0

EXAMPLE 8

A magnetic disk was formed following the same procedures as in Example 1, except that an abrasive tape was pressed onto a protective film surface at a load of 10 g to abrade the protective film surface, and a calcination operation was performed at 80° C. Since a dangling bond density "nd" and a functional group density "nd" were $3.1 \times 10^{11}$ bonds/cm$^2$ and $2.5 \times 10^{11}$ bonds/cm$^2$, r=1.2.

Comparative Example 1

A magnetic disk is formed following the same procedures as in Example 1, except that after a magnetic disk substrate was taken out and exposed in the air without abrading a protective film surface, a lubricant film 4 was coated onto the magnetic disk substrate which was not calcined. Since a dangling bond density "nd" was $10^{10}$ bonds/cm$^2$, r=0.1.

Comparative Example 2

A magnetic disk was formed following the same procedures as in Example 1, except that an abrasive tape was pressed onto a protective film surface at a load of 1 g for 10 minutes to abrade the protective film surface, and a calcination operation was not performed. Since a dangling bond density "nd" was $6 \times 10^{10}$ bonds/cm$^2$, r=0.9.

Figure 2:
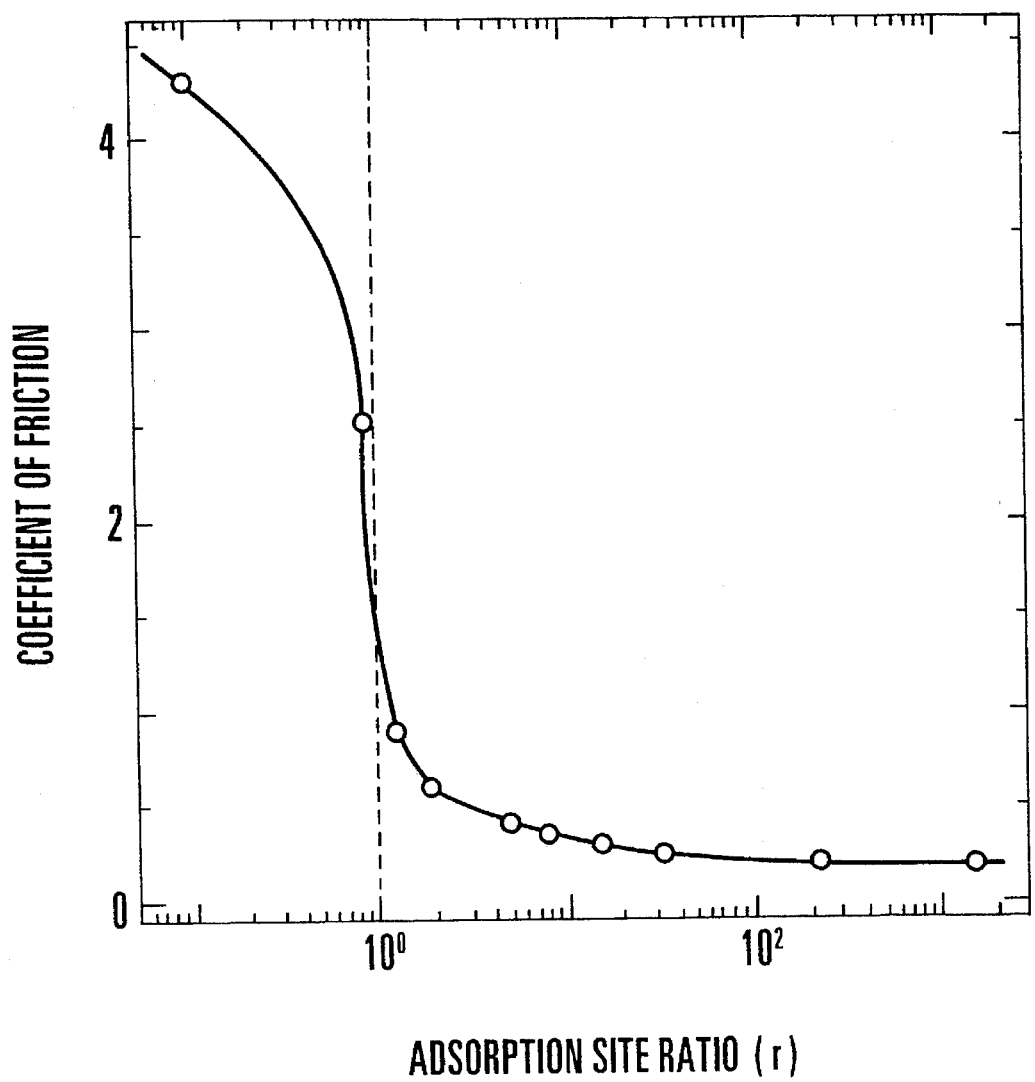
FIG. 2 is graph showing results obtained when the durability of the magnetic storage medium according to the present invention is evaluated.

A magnetic disk formed according to each of Examples 1 to 8 was evaluated by performing a start.stop repetition test (CSS test) 20,000 times, a coefficient of friction of 0.2 obtained before the test changed as shown in FIG. 2 by a difference between adsorption site ratios "r" after the test was performed 20,000 times. In FIG. 2, a broken line indicates a case wherein the adsorption site ratio "r" is 1 (=10$^0$). In a range in which the adsorption site ratio "r" exceeds 1 in each of Examples 1 to 8, a coefficient of friction obtained after the test is 1.0 or less. However, when the adsorption site ratio "r" becomes close to 1, the coefficient friction abruptly increases. As in Comparative Examples 1 and 2, when the adsorption site ratio "r" becomes 1 or less, mechanical durability is abruptly degraded because the coefficient of friction exceeds 1.0. Note that, in Example 8 in which r=1.2, a coefficient of friction obtained after the CSS test was 0.9. In addition, in Comparative Example 2 in which r=0.9, a coefficient of friction was 2.5.

In this manner, it was found that the mechanical durability of a magnetic disk in which a lubricant film was coated on a carbon film having dangling bonds designed to have an adsorption site ratio "r" exceeding 1 was considerably improved. In addition, an adsorption site ratio "r" of a magnetic disk abraded by a head is higher than that of a magnetic disk abraded by an abrasive tape, and their coefficients of friction after the CSS test are obtained vice versa. Therefore, it is understood that the head removes the surface layer efficiently more than the abrasive tape to produce dangling bonds.

As has been described above, a magnetic storage medium according to the present invention has a lubricant film which is hard to be removed by bringing a head into slidable contact with a protective film and a self-restoring function obtained by re-adsorption of the magnetic storage medium. Therefore, friction caused by bringing the head into slidable contact with the magnetic storage medium decreases, and the mechanical durability of the magnetic storage medium can be improved.

What is claimed is:

1. A method of manufacturing a magnetic storage medium, comprising the steps of:

forming a protective film constituted by a carbon thin film on a substrate including a magnetic body in a vacuum atmosphere;

forming dangling bonds on a surface of said protective film by mechanically abrading the surface of said protective film in the vacuum atmosphere in which said protective film is formed; and coating a lubricant film on said protective film in which dangling bonds are formed in the vacuum atmosphere.

2. A method according to claim 1, further comprising the step of calcining said substrate on which said lubricant film is coated in atmospheric air to adsorb functional groups of said lubricant film in said dangling bonds, and the step of dipping said calcined substrate into a solvent to remove an excessive lubricant film.

3. A method according to claim 2, wherein a density of said functional groups of said lubricant film changes depending on calcination conditions of said substrate, and an adsorption site ratio (density of dangling bonds/density of functional groups of lubricant film) which is a ratio of a density of said dangling bonds to a density of functional groups of said lubricant film changes depending on a change in the density of said functional groups of said lubricant film.

4. A method according to claim 1 wherein the step of forming said dangling bonds comprises the step of bringing one of a plurality of magnetic heads and an abrasive tape into slidable contact with the surface of said protective film to abrade the surface of said protective film.

5. A method according to claim 4, wherein the step of bringing one of said plurality of magnetic heads and said abrasive tape into slidable contact with the surface of said protective film is performed using slidable contact conditions, wherein said vacuum atmosphere has a degree of vacuum of $10^{-6}$ Torr, a load falls within a range of 1 to 100 g, a rotational speed falls within a range of 10 to 300 rpm, and a slidable contact time falls within a range of 1 to 120 seconds.

6. A method according to claim 1, wherein a degree of vacuum of said vacuum atmosphere in which dangling bonds are formed is not less that $10^{-3}$ Torr.

* * * * *